United States Patent Office 3,562,034
Patented Feb. 9, 1971

3,562,034
VULCANIZATION OF ALLYLIC HALIDE TERMINATED POLYMERS OF DIOLEFINIC HYDROCARBONS
Douglas C. Edwards, Sarnia, Ontario, Canada, assignor to Polymer Corporation, Sarnia, Ontario, Canada, a body corporate and politic
No Drawing. Filed Nov. 17, 1967, Ser. No. 683,818
Claims priority, application Canada, Nov. 28, 1966, 976,539
Int. Cl. C08d 3/14
U.S. Cl. 149—19         6 Claims

ABSTRACT OF THE DISCLOSURE

An aqueous emulsion polymerized undegraded olefinically unsaturated liquid polymer containing molecules of polymerized $C_4$–$C_8$ diolefinic hydrocarbons with a major proportion of said molecules having two separated allylic halide groups represented by the

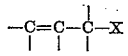

structure is vulcanized with a substance selected from metals and metal compounds such as zinc, zinc oxide, zinc strearate, ferric chloride or bromide, mercuric acetate and stannic oxide.
The vulcanization is carried out at a temperature of about 60–150° C. The product is suitable for use as a rocket fuel binder.

---

This invention relates to terminally-active liquid polymers of diolefinic hydrocarbon monomers and particularly to vulcanizates of these polymers.
In this specification, "liquid" polymers are defined broadly as pourable polymers, such polymers generally have intrinsic viscosities in toluene at 30° C. of about 0.04–1.0 dl./g., and "vulcanizates" are the solid reaction products of the liquid polymer with substances which are capable of linking molecules of the liquid polymer.
Previously, liquid polymers of $C_4$–$C_8$ diolefins, containing allylic halogen groups have been mixed with multifunctional amines and vulcanized therewith. The liquid polymers have been fully described in French Pat. 1,488,811.
However, such mixtures have the disadvantage that they vulcanize at low to moderate temperatures, such as room temperature, which limits their use in certain applications. Also, when the liquid polymer is used as a rocket fuel binder, multifunctional amines should not be present; amines and other basic substances are regarded as unsafe when used in the presence of oxidizing substances such as ammonium perchlorate. It is therefore highly desirable to develop non-basic curing systems for the liquid polymer which do not cause vulcanization at room temperature and which impart a satisfactory rate of cure at higher temperatures.
It has now been found that a more attractive composition is provided by a mixture comprised of (a) a major amount of an aqueous emulsion polymerized undegraded olefinically unsaturated unvulcanized liquid polymer composition containing molecules of a polymerized $C_4$–$C_8$ diolefinic hydrocarbon compound, a major proportion of said molecules being characterized by the presence of two separated

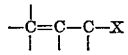

structures within their molecular structures, where X is a halogen atom selected from the group consisting of bromine, chlorine and iodine, and (b) a minor amount of a substance selected from metals and their compounds.
The liquid polymer used in this invention is fully described, along with its process of manufacture, in French Pat. 1,488,811. In brief, it can be described as a $C_4$–$C_8$ diolefin polymer, containing two separated, preferably terminal, allylic halogen groups within its structure, and having an intrinsic viscosity of 0.04–1.0, and preferably 0.05–0.6 dl./g. when measured in toluene at 30° C. More than one diolefinic hydrocarbon compound may be employed to form the diolefinic portion of the liquid polymers when the polymer is a copolymer of a diolefin and a mono-olefin, more than one mono-olefinic monomer may be used to form the non-diolefinic portion of the polymer. The $C_4$–$C_8$ diolefins which may be employed include conjugated diolefins such as butadiene-1,3; 2-methyl butadiene-1,3; pentadiene-1,3; hexadiene-1,3; 2,3-hexadiene-1,3; 2-chloro-butadiene-1,3 and 2,3-dimethyl butadiene-1,3 with butadiene-1,3 being preferred. The monoolefinic monomers include compounds such as styrene, acrylonitrile and methyl methacrylate. Of the various liquid homopolymers and copolymers which may be used in this invention, those containing a major proportion of polymerized butadiene-1,3 are preferred. The allylic halogen group may be represented by the formula

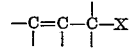

where X is chlorine, bromine or iodine. Broadly, the halogen content of the unvulcanized polymers falls within the range of 1 to 15 weight percent of the total weight of the polymer composition and preferably within the range of 1.5 to 10 weight percent.
The second component of this invention, in admixture with the liquid polymer, is a substance selected from metals and their compounds. In addition to the metals, examples of suitable substances include such compounds as the oxides, the halides, the carbonates, the sulfates, the nitrates, the salts of saturated and unsaturated carboxylic acids, the alkyl thiocarbamates, and the alkyl xanthates of the metals. Examples of suitable compounds include ferric chloride, zinc oxide, mercuric acetate, stannic chloride, zinc chloride, mercuric carbonate, cadmium acetate, ferric bromide, zinc stearate, cadmium stearate, zinc oleate, stannic oxide, cadmium diethyl dithiocarbamate, zinc ethyl phenyl dithiocarbamate, cadmium pentamethylene dithiocarbamate, zinc dibutyl xanthate, the zinc salt of 2-mercaptobenzothiazole, etc. The preferred compounds are the more readily available compounds of zinc. The most preferred compounds are organic compounds of zinc, such as those described above, which are readily dispersible in the liquid polymer.
The amount of substance used in the mixture is minor to the amount of liquid polymer and is in the range of about 0.1–20 parts by weight per 100 parts by weight of liquid polymer and preferably in the range of about 0.2–10 parts by weight.
The rate of vulcanization of the liquid polymer will vary dependent on the temperature, the amount and type of vulcanizing substance, the method of recovery of the liquid polymer from its latex, etc. The preferred method of recovery is to coagulate the polymer in an acidic aqueous medium with a reagent selected from an ionizable salt, such as aluminum sulfate and organic solvents, such as methanol and acetone; the coagulated liquid polymer is then washed with acetone or a lower alcohol such as ethanol. Acid coagulated polymer is preferred because it appears to require less vulcanizing substance to impart satisfactory vulcanization characteristics than does polymer coagulated in alkaline media.
Compounding ingredients, such as fillers, colouring pigments, tackifiers and plasticizers also may be incorporated into the compositions of this invention. Examples of fillers include carbon blacks, powdered metals, silicas, clays, calcium carbonate, metal oxides, etc. The plasticizer used must be compatible with the liquid polymer. Suitable plasticizers include aromatic, paraffinic and naphthenic oils, esters, chlorinated polyphenyls, etc.

The following examples will further illustrate the invention. In these examples, all parts are parts by weight.

EXAMPLE I 100 parts of butadiene and 15 parts of tetrabromomethane were emulsified in 200 parts of water containing 5 parts of dissolved sodium alkyl aryl sulfonate and 5 parts of dissolved tri-potassium phosphate buffer. After raising the temperature of the system to 140° F., 0.75 part of potassium persulfate was added. A further 0.25 part of potassium persulfate was added in increments to the agitated emulsion during the course of the reaction. After 75 hours, 75% of the butadiene was converted to polymer in the form of aqueous latex. The polymer was recovered by coagulation with aluminum sulfate, then purified by washing with acetone followed by drying under agitation at 200° F. 1.25 parts of methylene-bis (2-nonyl-4-methyl) phenol antioxidant were added prior to the drying step. The liquid polymer was repurified by dissolving in benzene and precipitating with excess acetone; the polymer was then stabilized with antioxidant and dried as described previously. The polymer was a viscous liquid having an intrinsic viscosity in toluene at 30° C. of 0.29 dl./g. and a combined bromine content of 3.5%.

Two compounds were prepared containing 5 and 10 parts respectively of zinc oxide per 100 parts of liquid polymer. Vulcanization was apparent after heating the compounds at 150° C. The stress-strain properties of vulcanizates cured at 150° C. are shown in Table I.

TABLE I

| Property | Cure time, minutes | Zinc oxide loading, parts 5 | 10 |
| --- | --- | --- | --- |
| Tensile strength, p.s.i. | 10 | 150 | 235 |
|  | 20 | 150 | 260 |
|  | 40 | 150 | 215 |
| Elongation | 10 | 765 | 860 |
|  | 20 | 700 | 720 |
|  | 40 | 630 | 710 |
| 300% modulus | 10 | 40 | 40 |
|  | 20 | 45 | 50 |
|  | 40 | 55 | 60 |

The data indicate that the presence of 5–10 parts zinc oxide caused vulcanization of the liquid polymer at 150° C.

EXAMPLE II 5 parts of zinc stearate were mixed with 100 parts of the liquid polymer of Example I on a paint mill. A portion of the compound was placed in an oven at 60° C. and the following observations were made:

Time (hours):     Remarks
1 — N.C.
2 — N.C.
18 — N.C.
90 — Dry elastic vulcanizate with low E.B.

In this specification, "N.C." is used as an abbreviation for no cure and "E.B." is used as an abbreviation for elongation at break.

Vulcanization was apparent in another portion of the compound which was heated for 20 minutes at 150° C.

These results show that the liquid polymer is vulcanized by zinc stearate when heated at 60–150° C.

EXAMPLE III

The procedure of Example II was followed except that the amount of zinc stearate was varied. Portions of the compound were placed in an oven at 60° C. and the following observations were made:

| Time, hours | Zinc oxide loading, parts | | | |
| --- | --- | --- | --- | --- |
|  | 2 | 3 | 4 | 5 |
| 24 | N.C. | N.C. | N.C. | N.C. |
| 48 | Gelled | Cured | Cured | Cured. |
| 72 | Soft tacky solid | Cured, low E.B. | Cured, very low E.B. | Cured, very low E.B. |
| 96 | Cured | Cured, very low E.B. |  |  |
| 168 | Cured, low E.B. |  |  |  |

Certain of the above vulcanizates were tested for solubility and swelling characteristics in benzene. These results are reported in Table II.

TABLE II

| Zinc stearate loading, parts: | Cure time at 60° C., hours | Percent insoluble | Swelling index |
| --- | --- | --- | --- |
| 2 | 96 | 75 | 9.6 |
|  | 168 | 90 | 5.2 |
| 3 | 48 | 78 | 8.7 |
|  | 72 | 89 | 5.5 |
| 4 | 48 | 91 | 4.3 |
|  | 72 | 92 | 4.0 |
| 5 | 48 | 89 | 5.1 |
|  | 72 | 92 | 4.1 |

Swelling index is defined as the ratio of weight of swollen polymer, after 48 hours immersion in excess benzene at 30° C., to weight of dry insoluble polymer.

The above vulcanizates containing 2 parts zinc stearate showed no change in solubility and swelling characteristics when they were allowed to stand for several weeks at room temperature.

The compounds were also heated at 150° C. The compound containing 2 parts zinc stearate did not cure within 80 minutes at this temperature. Properties of the other vulcanizates are reported in Table III.

TABLE III

| Zinc stearate loading, parts | Cure time at 150° C., minutes | Tensile strength, p.s.i. | Elongation, percent | 100% modulus, p.s.i. |
| --- | --- | --- | --- | --- |
| 3 | 40 | 50 | 415 | 15 |
|  | 80 | 80 | 440 | 20 |
| 4 | 20 | 110 | 615 | 20 |
|  | 40 | 110 | 310 | 40 |
|  | 80 | 115 | 275 | 55 |
| 5 | 10 | 110 | 475 | 30 |
|  | 20 | 125 | 345 | 45 |
|  | 40 | 135 | 290 | 60 |
|  | 80 | 145 | 270 | 60 |

These results show that the rate of cure of the liquid polymer can be controlled by varying the amount of zinc stearate added. They also demonstrate that such vulcanizates are stable with no tendency to cross-link further when held at room temperature.

EXAMPLE IV

The procedure of Example II was followed except that several different chemical compounds were used in varying amounts to vulcanize the liquid polymer. Portions of the mixtures were heated for 60 minutes at 150° C. and the following observations were made:

TABLE IV

| Compound | Amount, parts | Remarks | Tensile strength, p.s.i. | Elongation, percent | 100% modulus, p.s.i. |
|---|---|---|---|---|---|
| Zinc acetate | 3 | Cured | 95 | 225 | 55 |
| Zinc oleate | 5 | do | 145 | 220 | 80 |
| Zinc metal | 0.5 | do | 130 | 205 | 75 |
| Zinc dibutyl xanthate | 3 | do | 225 | 170 | 135 |
| Zinc oxide | 5 | do | 140 | 215 | 85 |
| Zinc stearate | 4 | do | 175 | 180 | 115 |
| Ferric chloride | 2 | do | 170 | 90 | |
| Ferric bromide | 2 | do | 155 | 65 | |
| Zinc dibutyl dithiocarbamate | 4 | Tacky, some cure | 75 | 765 | 10 |
| Mercuric acetate | 2 | do | | | |
| Cadmium acetate | 3 | Set-up, slight cure | | | |
| Cadmium stearate | 2 | do | | | |
| Stannic chloride | 2 | do | | | |
| Stannic oxide | 2 | Set-up | | | |
| None (control) | | N.C | | | |

Other portions of the mixtures showed no indication of vulcanization after being held for 1 week at room temperature.

These results show that the liquid polymer can be vulcanized with metals and their compounds.

EXAMPLE V

A specially purified form of the liquid polymer of Example I was used in these experiments. The purification was carried out by dissolving the polymer in benzene, centrifuging the solution until a clear supernatant liquid was obtained, concentrating the supernatant solution, and precipitating with a large excess of acetone; the polymer was then stabilized with antioxidant and dried as described previously.

100 parts of liquid polymer and 3 parts of zinc stearate were extended with various amounts of a naphthenic oil, the mixing being carried out on a paint mill. The effect of oil content on bulk viscosity, viscosity being measured with a Brookfield RVT viscometer with a TF spindle rotating at 20 r.p.m., and on vulcanizate properties of compounds cured for 20 minutes at 150° C. is shown in Table V.

TABLE V

| Property | Naphthenic oil loading, parts | | |
|---|---|---|---|
| | 0 | 25 | 50 |
| Viscosity (poise): | | | |
| At 25° C | 575 | 245 | 125 |
| 50° C | 125 | 50 | 30 |
| Tensile strength, p.s.i | 210 | 75 | 40 |
| Elongation, percent | 165 | 250 | 300 |
| 300% modulus, p.s.i | 160 | 35 | 15 |

Previous results have indicated that the liquid polymer cures slowly at 60° C. when the substances of this invention are used as vulcanizing agents. The above results show that the liquid polymer when extended with oil has viscosity characteristics which make the composition suitable for use as a rocket fuel binder.

The composition of the present invention has the advantage when used as a rocket fuel binder of being insensitive to moisture and small changes in temperature. By contrast, prior art compositions require the use of sensitive complex curing systems which are frequently toxic.

What is claimed is:

1. A composition vulcanizable to a solid rubber-like material which comprises a mixture of (a) an aqueous emulsion polymerized undegraded olefinically unsaturated unvulcanized liquid polymer of a $C_4$–$C_8$ diolefinic hydrocarbon, said polymer having an intrinsic viscosity of 0.04–1.0 dl./g. measured in toluene at 30° C., a major proportion of molecules of said polymer having two terminal

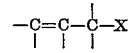

structures where X is a halogen atom selected from the group consisting of bromine, chlorine and iodine, and (b) a substance selected from the group consisting of zinc metal, zinc oxide, zinc salts of carboxylic acids, zinc xanthates, zinc dithiocarbamates, ferric halides, stannic chloride, stannic oxide, cadmium salts of carboxylic acids and mercury salts of carboxylic acids, said substance being present in an amount of about 0.1–20 parts by weight per 100 parts by weight of liquid polymer.

2. The composition according to claim 1 in which said liquid polymer is a polymer of butadiene-1,3.

3. The composition according to claim 2 in which the halogen atom is bromine.

4. The composition according to claim 1 in which substance (b) is a ferric halide.

5. The composition according to claim 1 in which substance (b) is a zinc salt of a carboxylic acid.

6. A process of producing a solid rubber-like vulcanized material which comprises heating at a temperature of about 60° C.–150° C. a composition comprising a mixture of (a) an aqueous emulsion polymerized undegraded olefinically unsaturated unvulcanized liquid polymer of a $C_4$–$C_8$ diolefinic hydrocarbon, said polymer having an intrinsic viscosity of 0.04–1.0 dl./g. measured in toluene at 30° C., a major proportion of molecules of said polymer having two terminal

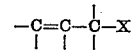

structures where X is a halogen atom selected from the group consisting of bromine, chlorine and iodine, and (b) a substance selected from the group consisting of zinc metal, zinc oxide, zinc salts of carboxylic acids, zinc xanthates, zinc dithiocarbamates, ferric halides, stannic chloride, stannic oxide, cadmium salts of carboxylic acids and mercury salts of carboxylic acids, said substance being present in an amount of about 0.1–20 parts by weight per 100 parts by weight of liquid polymer.

References Cited

UNITED STATES PATENTS 3,135,716   6/1964   Uraneck et al. _____ 260—836
3,332,812   7/1967   Guthrie _____ 149—19X DONALD E. CZAJA, Primary Examiner D. J. BARRACK, Assistant Examiner U.S. Cl. X.R.

149—19; 260—29.7, 41.5, 83.3, 85.1, 85.5, 86.3, 91.7, 92.3